3,275,526
METHOD FOR PRODUCING OROTIDINE
Teruo Shiro, Shimpachi Konishi, and Shinji Okumura, Kanagawa-ken, and Masahiro Takahashi, Tokyo, Japan, assignors to Ajinomoto Co., Inc., Tokyo, Japan
No Drawing. Filed Nov. 19, 1963, Ser. No. 324,823
Claims priority, application Japan, Nov. 20, 1962, 37/50,859
4 Claims. (Cl. 195—28)

This invention relates to methods for producing orotidine by bacterial fermentation under aerobic conditions.

Orotidine (4(6)-carboxy-uracil-N-riboside) is a substance obtained by the combination of orotic acid and ribose and is the main component of orotidylic acid. The orotidylic acid is obtained, following the procedure of pyrimidine nucleotide synthesis, as a precursor of pyrimidine nucleotide which is an important element of nucleic acid.

As it has heretofore been impossible to obtain orotidine in large quantities at low prices, due to difficulties in its chemical synthesis, and as it is not generally found as a natural material in free condition, orotidine has not generally been employed as a medicine as is orotic acid.

Orotidine is structurally closer to pyrimidine nucleotide than orotic acid. If it were to be possible to obtain it on an industrial scale at low cost, its use would increase in the medical and chemical fields. Moreover, as the process disclosed hereunder lends itself to the production of nucleic acid and related compounds on an industrial scale, a great contribution is hereby made to this field.

A characteristic feature of this invention involves culturing an artificially induced biochemical mutant of bacteria, having the capacity of producing orotidine extracellularly, in a culture medium including a source of assimilable carbon and a source of assimilable nitrogen, under aerobic conditions, and recovering orotidine from the medium after it has been produced and accumulated therein.

We have succeeded in obtaining artificially induced biochemical mutants of *Bacillus subtilis* which are capable of producing orotidine on an industrial scale. The abilities of said mutants for producing orotidine are very strong, and we have thereby established methods for producing orotidine by fermentation.

The strains utilized in this invention are artificially induced biochemical mutants which have the capacity to produce and accumulate orotidine extracellularly. Their parent strains, which are *Bacillus subtilis*, are not normally capable of producing significant amounts of orotidine.

The methods to induce the biochemical mutants of bacteria used for our process are as follows: The vegetative cells or spores of the parent strains of *Bacillus subtilis* are exposed to ultraviolet light, X-rays or gamma radiation, or are placed in contact with a solution of sodium nitrite; thereby biochemical mutants result which have the capacity of producing orotidine extracellularly in an aerobic culture medium.

The mutants are separated from the unchanged strains by conventional screening techniques and by making use of the fact that the mutants are auxotropic (cf. Werner Brown: Bacterial Genetics, W. B. Saunders Company (1953)). The minimal medium used for the screening of biochemical mutants (nutrient requiring mutants) is Gray-Tatum medium which is exemplified in Table I below. Normally, the parent strains of *Bacillus stubtilis* are capable of growth in this Gray-Tatum medium. If the parent strains required some additional materials for growth, we used a modified Gray-Tatum medium (usually having added thereto the required additional materials for the parent strains). However, the biochemical mutants utilized in accordance with our invention do not grow in such media.

TABLE I.—GRAY-TATUM MEDIUM

| | |
|---|---|
| Ammonium chloride _____ g__ | 5 |
| Ammonium nitrate _____ g__ | 1 |
| Sodium sulfate _____ g__ | 2 |
| Magnesium sulfate _____ g__ | 0.1 |
| Dipotassium hydrogen phosphate _____ g__ | 3 |
| Potassium dihydrogen phosphate _____ g__ | 1 |
| Calcium chloride _____ mg__ | 1 |
| Zinc sulfate _____ mg__ | 8.8 |
| Ferric chloride _____ mg__ | 0.9 |
| Copper sulfate _____ mg__ | 0.4 |
| Manganese chloride _____ mg__ | 0.07 |
| Glucose _____ g__ | 0.5 |

Water sufficient to make 1 liter.

The rate of orotidine formation in the screening medium and the maximum concentration of orotidine reached was determined, and the artificially induced biochemical mutants most capable of producing and accumulating orotidine were selected. The composition of the screening medium is shown in Table II.

TABLE II.—SCREENING MEDIUM FOR OROTIDINE PRODUCTION

| | Percent |
|---|---|
| Glucose _____ | 5 |
| Potassium dihydrogen phosphate _____ | 0.2 |
| Magnesium sulfate heptahydrate _____ | 0.04 |
| Ferrous sulfate _____ | 0.0005 |
| Manganese sulfate _____ | 0.0005 |
| Yeast extract _____ | 0.5 |
| Ammonium chloride _____ | 0.4 |
| Urea _____ | 0.6 |
| Peptone _____ | 0.5 | pH 7.0.

Various methods of analysis were employed for determining the orotidine concentration in the fermentation medium. Paper chromatography, filter paper electrophoresis, orcinol reaction for ribose, and ultraviolet absorption spectrum techniques were found most convenient for determining the several components in the medium analyzed. The identification of isolated crystals was effected by conventional comparison tests, inclusive of ultraviolet absorption spectrum, infrared spectrum, melting point, $R_f$ value of paper chromatography, migration of filter paper electrophoresis, analysis of elements, and orcinol reaction with authentic sample of orotidine.

The artificially induced biochemical mutants capable of producing and accumulating orotidine generally require uracil, uridine or uridylic acid for their growth. These substances are employed in an amount necessary for the growth of the mutant or auxotroph and, as will be seen from the examples which follow hereinafter, in an amount of about 5–15 mg./dl. of culture medium. It will also be seen that the mol concentration of orotine produced far exceeds the amount of these nutrients which are employed.

From the sequence of biological synthesis of pyrimidine nucleotides shown below, it can be seen that said mutants undergo a genetic block between orotidylic acid and uridylic acid by the mutation techniques, so that they require uracil, uridine or uridylic acid for growth as well as the production and accumulation of orotidine.

BIOLOGICAL SYNTHESIS OF A PYRIMIDINE NUCLEOTIDE AND MECHANISM OF EXCRETION OF OROTIDINE BY MUTANTS

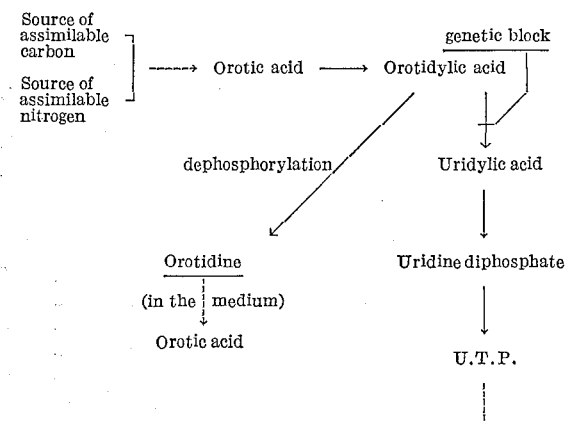

U.T.P.: Uridine triphosphate.

Typical artificially induced biochemical mutants of the aforementioned microorganisms which produce and accumulate orotidine in the culture medium are the *Bacillus subtilis* strain No. 167 (ATCC No. 15181), No. 217 (ATCC No. 15182), No. 309 (ATCC No. 15183), and No. 2–217 (ATCC No. 15184). The strain No. 2–217 is characterized by its adenine, adenosine or adenylic acid, and uracil, uridine or uridylic acid requirements for growth, whereas the other three strains require only uracil, uridine or uridylic acid. The strain No. 2–217 was induced from an adenine requiring mutant of *Bacillus subtilis* which can grow in the modified Gray-Tatum medium containing 1 mg. percent of adenine. The strains No. 167, No. 217, and No. 309 are not able to grow in the Gray-Tatum medium, but they grow when uracil, uridine or uridylic acid is added to the medium. Further, if we add adenine, adenosine or adenylic acid to the Gray-Tatum medium containing uracil derivatives, the strain No. 2–217 is able to grow in the medium. This strain No. 2–217 is capable of producing and accumulating a small quantity of orotic acid with a large quantity of orotidine in the fermentation medium.

The medium in which the mutant strains of this invention are cultured must contain assimilable carbon sources, assimilable nitrogen sources, certain inorganic salts and nutrients required by microorganisms. The medium should be prepared to be good for bacterial growth and for the progress of the fermentation of orotidine.

The sources of assimilable carbon compounds are carbohydrates, such as soluble starch, starch hydrolyzate, glucose, sucrose, and industrial products rich in sugars. Table III shows the variations in orotidine formation according to the various carbon sources added. The orotidine values in grams per liter were obtained with *Bacillus subtilis* No. 167 and No. 2–217 under aerobic conditions (20 ml. medium in a shaking 500 ml. flask) at 31.5° for 72 hours.

TABLE III

| Carbon source added, 5% | No. 167 | No. 2-217 |
|---|---|---|
| Glucose | 2.72 | 2.53 |
| Sucrose | 2.10 | 2.06 |
| Molasses | 1.84 | 1.37 |
| Soluble starch | 2.44 | 2.41 |
| Starch hydrolyzate | 2.95 | 2.78 |

Basal medium (pH 7.0):

|  | Percent |
|---|---|
| Potassium dihydrogen phosphate | 0.5 |
| Magnesium sulfate heptahydrate | 0.04 |
| Ferrous sulfate | 0.0005 |
| Manganese sulfate | 0.0005 |
| Ammonium chloride | 1.5 |
| Ammonium nitrate | 0.2 |
| Urea | 0.3 |
| Casein hydrolyzate | 0.2 |
| Ribonucleic acid | 0.15 |
| Calcium carbonate | 5 |

The sources of assimilable nitrogen required for orotidine production included ammonium salts, nitrate, urea, and ammonia supplied as an aqueous solution or gaseous ammonia admixed to the air of aeration in known manner. The nitrogen of proteins or amino acids is also assimilated by the microorganisms.

Certain inorganic salts are necessary for the fermentation. They should form phosphate, sulfate, chloride, and various other kinds of metal ions such as potassium, sodium, magnesium, ferrous or ferric, and manganous ions.

The more complex organic materials which enhance the growth of the microorganisms and accelerate the production of orotidine are important for making the process economically possible. Their presence affects the orotidine yield, the maximum orotidine concentration in the medium, and the rate of orotidine production. The nutrients or growth accelerating agents of this group include nucleosides, nucleotides, bases of the same, amino acids, various vitamins, and materials which contain these substances or are transformed into the same under fermentation conditions. Said materials include ribonucleic acid obtained from animals, plants, and microorganisms, protein hydrolyzate, corn steep liquor, extract obtained from microorganisms, and dry cells of microorganisms. The effects of the addition of nutrients are shown in Table IV. The orotidine values in grams per liter were obtained with *Bacillus subtilis* No. 217 under aerobic conditions (20 ml. medium in a shaking 500 ml. flask) at 30° C. for 64 hours.

TABLE IV

| Uracil | | Ribonucleic acid | | Yeast extract | | Dry Yeast | |
|---|---|---|---|---|---|---|---|
| Added mg./l. | Orotidine | Added g./l. | Orotidine | Added g./l. | Orotidine | Added g./l. | Orotidine |
| 0 | 0 | 0 | 0 | 0 | 0 | 0 | 0 |
| 10 | 2.2 | 0.5 | 3.0 | 2 | 0.7 | 5 | 1.8 |
| 50 | 2.8 | 1.0 | 3.6 | 4 | 1.1 | 8 | 3.0 |
| 100 | 3.7 | 1.2 | 2.9 | 6 | 1.8 | 10 | 3.9 |
| 150 | 0.3 | 1.5 | 2.1 | 8 | 2.2 | 12 | 3.5 |
| 250 | 0 | 1.8 | 1.4 | 10 | 1.3 | 15 | 2.8 |
| 500 | | 2.0 | 0.9 | 12 | 0.7 | 20 | 2.7 |

Basal medium (pH 7.0): Percent
    Glucose _____ 5
    Potassium dihydrogen phosphate _____ 0.5
    Magnesium sulfate heptahydrate _____ 0.04
    Ferrous chloride _____ 0.0004
    Manganese chloride _____ 0.0004
    Ammonium chloride _____ 1.3
    Ammonium sulfate _____ 0.1
    Diammonium hydrogen phosphate _____ 0.1
    Peptone _____ 0.5
    Calcium carbonate _____ 2.5

The pH values of the fermentation medium must be controlled in order not to become too acidic or too alkaline during the fermentation. For this purpose, it is effective to add calcium carbonate, precipitable calcium phosphate, aqueous ammonia, gaseous ammonia, sodium hydroxide, potassium hydroxide, phosphoric acid, hydrochloric acid to the fermentation medium. The most suitable pH value for producing and accumulating orotidine is about 7.0, but good results are generally obtained between 5.0 and 8.5. The influence of pH on orotidine production in cultures of *Bacillus subtilis* No. 217 is illustrated by Table V which lists results obtained with cultures processed for 64 hours. The indicated pH values were maintained by additions of aforementioned reagents during the fermentation. The orotidine values in grams per liter were obtained under aerobic conditions (20 ml. medium in a shaking 500 ml. flask).

TABLE V

| pH | Temperature of culture (C) | | | | |
|---|---|---|---|---|---|
| | 25° | 27° | 30° | 37° | 40° |
| 5.0 | 0 | 0.9 | 1.0 | 1.0 | 0 |
| 5.0–6.5 | 0.6 | 2.3 | 2.8 | 2.6 | 0.3 |
| 6.5–7.5 | 1.9 | 2.9 | 3.1 | 3.0 | 0.7 |
| 7.5–8.5 | 0.7 | 1.8 | 2.3 | 2.2 | 0.7 |
| 8.5 | 0 | 0.4 | 0.7 | 0.5 | 0 |

Basal medium: Percent
    Glucose _____ 5
    Potassium dihydrogen phosphate _____ 0.5
    Magnesium sulfate heptahydrate _____ 0.04
    Ferrous sulfate _____ 0.0005
    Manganese sulfate _____ 0.0005
    Ammonium chloride _____ 1.5
    Peptone _____ 0.3
    Ribonucleic acid _____ 0.8
    Corn steep liquor _____ 0.1

Useful results are not usually obtained outside the temperature range of between 25° C. and 40° C., and temperatures between 27° C. and 37° C. are preferred. The influence of temperature on the orotidine yield by *Bacillus subtilis* No. 217 is also shown in Table V.

The mutant strains of the invention are cultured under aerobic conditions, and air is admixed to the medium either by shaking or by aeration and agitation. Fermentation is carried out for 2 days to 3 days.

The orotidine is recovered from the culture medium after the removal of microorganisms by using known methods. For example, we can obtain the comparatively pure orotidine solution by treating the medium with activated charcoal and anion exchange resins, and separate pure orotidine by repeating recrystallization with water.

The identification of isolated crystals can be performed by conventional comparison tests such as $R_f$ value of paper chromatography, migration of filter electrophoresis, ultraviolet absorption spectrum, melting point, infrared absorption spectrum, orcinol reaction, and analysis of element, etc., with a standard sample of orotidine.

The following examples are further illustrative of this invention, but it will be understood that the invention is not limited thereto.

*Example 1*

An aqueous culture medium was prepared having the following composition in grams per deciliter:

Glucose _____ 5
Potassium dihydrogen phosphate _____ 0.2
Magnesium sulfate heptahydrate _____ 0.04
Ferrous sulfate _____ 0.0005
Manganese sulfate _____ 0.0005
Ammonium chloride _____ 0.6
Urea _____ 0.4
Dry yeast _____ 1.0
Peptone _____ 0.4
Calcium carbonate _____ 2.0

The medium was sterilized at 110° C. for 5 minutes and the pH adjusted to about 7.0.

Three ml. of this medium were poured into several test tubes, and after sterilization at 115° C. for 5 minutes, the medium was inoculated with *Bacillus subtilis* mutant strain No. 217 which was obtained as aforementioned by the artificially induced biochemical mutant leading and screening method.

These test tubes then contained substances which were used as seed culture media after incubation at 30° C. for 20 hours with shaking.

Twenty ml. batches of the above-said medium were sterilized in 500 ml. flasks at 115° C. for 10 minutes. The medium in each flask was inoculated with 0.1 ml. of suspension of the above-said seed culture and incubated at 30° C. for 64 hours in a shaking culture. The fermented medium then contained 3.1 grams orotidine per liter.

Into two liters of combined media were added 90 grams of activated charcoal (40–60 mesh) and this was stirred for 30 minutes. Impurities such as bacterial cells, calcium carbonate, etc. were removed by washing with water, and a column filled with said charcoal. The orotidine was eluted with ethanol-concentrated ammonium hydroxide-water (volume ratio 1:1:2). The eluate was evaporated in vacuo and the pH of the solution was adjusted to 7.0 after the addition of one liter of water. This solution was passed through a Dowex-1 (anion exchange resin, 8% cross-linkage) formate column. After the column was washed with enough water, the orotidine was eluted with 0.1 N sodium formate aqueous solution. The eluate was collected in test tubes, one for each 20 ml., and the fractions which had optimum ultraviolet absorption spectrum at the range of 260 m$\mu$ to 270 m$\mu$ were collected. This fraction was passed through a column of Dowex-50 (cation exchange resin) for removing sodium ions. The obtained solution was concenterated to an oil in vacuo, and the resulting oil was dissolved in a minimum amount of water. Crude crystals of orotidine were formed with cooling. The pure crystals were obtained by recrystallization with water. A recovery of 2.3 grams was obtained.

*Example 2*

An aqueous culture medium was prepared having the following composition in grams per deciliter:

Glucose _____ 6
Potassium dihydrogen phosphate _____ 0.1
Magnesium sulfate heptahydrate _____ 0.04
Ferrous chloride _____ 0.0004
Manganese chloride _____ 0.0004
Ammonium chloride _____ 1
Uracil _____ 0.005
Sodium glutamate _____ 0.1
Calcium carbonate _____ 2

*Bacillus subtilis* mutant strain No. 217 was cultured by the method described in Example 1.

After the fermentation was carried out for 72 hours at 34° C., 2.6 grams of orotidine formed per liter of the fermented medium, and 2.8 grams of pure orotidine were recovered from 2 liters of above-said medium by the method described in Example 1.

*Example 3*

Bacillus subtilis mutant strain No. 167, which was obtained by the aforementioned artificially induced biochemical mutant leading and screening method, was cultured in a medium sterilized as described in Example 1 and containing (in grams per deciliter):

| | |
|---|---|
| Glucose | 6 |
| Potassium dihydrogen phosphate | 0.1 |
| Magnesium sulfate heptahydrate | 0.04 |
| Ferrous sulfate | 0.0005 |
| Manganese sulfate | 0.0005 |
| Ammonium chloride | 1 |
| Yeast extract | 0.7 |
| Peptone | 0.2 |
| Calcium carbonate | 2 |

After 64 hours' fermentation at 30° C., the medium was found to contain 2.7 grams of orotidine per liter, and 1.2 grams orotidine were recovered from 1 liter of the medium as described in Example 1.

*Example 4*

Bacillus subtilis mutant strain No. 309, which was obtained by aforementioned artificially induced biochemical mutant leading and screening method, was cultured in a medium sterilized as described in Example 1 and containing (in grams per deciliter):

| | |
|---|---|
| Glucose | 6 |
| Potassium dihydrogen phosphate | 0.15 |
| Magnesium sulfate heptahydrate | 0.04 |
| Ferrous sulfate | 0.0005 |
| Manganese sulfate | 0.0005 |
| Ammonium chloride | 1 |
| Ribonucleic acid (purity 75%) | 0.1 |
| Peptone | 0.2 |
| Calcium carbonate | 2 |

After 64 hours' fermentation at 30° C., the medium was found to contain 2.0 grams per liter of orotidine, and 0.8 gram of it was recovered from 1 liter of the medium as described in Example 1.

*Example 5*

Bacillus subtilis mutant strain No. 2–217, which was obtained by the aforementioned artificially induced biochemical mutant leading and screening method, was cultured in a medium sterilized as described in Example 1 and containing (in grams per deciliter):

| | |
|---|---|
| Glucose | 6 |
| Potassium dihydrogen phosphate | 0.1 |
| Magnesium sulfate heptahydrate | 0.04 |
| Ferrous sulfate | 0.0005 |
| Manganese sulfate | 0.0005 |
| Ammonium chloride | 1 |
| Adenine | 0.03 |
| Uracil | 0.005 |
| Calcium carbonate | 2 |

After 72 hours' fermentation at 30° C., the medium was found to contain 1.8 grams of orotidine and 0.3 gram of orotic acid per liter.

Five liters of this fermented medium were passed through a column of Dowex-1 after the treatment with activated charcoal, as described in Example 1. After the column was washed with enough water and 4 N formic acid, the mixed solution of 0.15 M ammonium formate and 4 N formic acid was passed through the column. The eluate was fractionated to fractions of 20 ml. each and the fractions which had optimum ultraviolet absorption spectrum at the range from 260 m$\mu$ to 270 m$\mu$ were collected.

The collected solution was evaporated in vacuo, and the residue was dissolved in a minimum amount of water. Crude crystals of orotidine were formed with cooling. Pure crystals were obtained by recrystallization with water, and 5.1 grams of the same were recovered.

The orotic acid which co-existed with orotidine in the fermented medium was found in the fractions of eluate which followed those of orotidine and had a maximum ultraviolet absorption spectrum in the range of from 275 m$\mu$ to 280 m$\mu$. The concentration and recrystallization were carried out by the same methods as for orotidine.

What is claimed is:

1. A method of producing orotidine which comprises aerobically culturing at least one auxotroph of *Bacillus subtilis* which requires a nutrient including at least one of the group consisting of uracil, uridine and uridylic acid for growth, in an aqueous culture medium including a source of assimilable carbon, a source of assimilable nitrogen, inorganic salts, an organic growth promoting agent, and 5 mg./dl. to 15 mg./dl. of said nutrient required by said auxotroph at a temperature substantially between 27° C. and 37° C. and at a pH value of between 5.0 and 8.0 until orotidine is accumulated in said medium, and recovering said orotidine.

2. A method as claimed in claim 1, wherein said auxotroph is selected from the group consisting of strains of *Bacillus subtilis* No. 167, *Bacillus subtilis* No. 217, *Bacillus subtilis* No. 309 and *Bacillus subtilis* No. 2–217, having respective ATCC Numbers 15181, 15182, 15183 and 15184.

3. A method of producing orotidine which comprises aerobically culturing at least one auxotroph of *Bacillus subtilis* which requires a nutrient including at least one of the group consisting of uracil, uridine and uridylic acid for growth, in an aqueous culture medium including a source of assimilable carbon, a source of assimilable nitrogen, inorganic salts, an organic growth promoting agent, and an amount of said nutrient required for the growth of said auxotroph at a temperature substantially between 27° C. and 37° C. and at a pH value of between 5.0 and 8.0 until orotidine is accumulated in said medium, and recovering said orotidine.

4. A method as claimed in claim 3, wherein said auxotroph is selected from the group consisting of strains of *Bacillus subtilis* No. 167, *Bacillus subtilis* No. 217, *Bacillus subtilis* No. 309 and *Bacillus subtilis* No. 2–217, having respective ATCC numbers 15181, 15182, 15183 and 15184.

References Cited by the Examiner

UNITED STATES PATENTS

| | | | |
|---|---|---|---|
| 2,788,346 | 4/1957 | Mitchell et al. | |
| 3,085,946 | 4/1963 | Kandewitz | 195—78 |
| 3,118,820 | 1/1964 | Uchida et al. | |
| 3,135,666 | 6/1964 | Hara et al. | |

A. LOUIS MONACELL, *Primary Examiner.*

ALVIN E. TANENHOLTZ, *Examiner.*